United States Patent
Mizokawa (10) Patent No.: US 12,049,111 B2
(45) Date of Patent: Jul. 30, 2024

(54) PNEUMATIC TIRE

(71) Applicant: Sumitomo Rubber Industries, Ltd., Kobe (JP)

(72) Inventor: Hiroki Mizokawa, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 0 days.

(21) Appl. No.: 17/543,784

(22) Filed: Dec. 7, 2021

(65) Prior Publication Data

US 2022/0203780 A1 Jun. 30, 2022

(30) Foreign Application Priority Data

Dec. 24, 2020 (JP) ................. 2020-215293

(51) Int. Cl.
*B60C 13/00* (2006.01)
*B60C 1/00* (2006.01)
*B60C 13/02* (2006.01)
*B60C 13/04* (2006.01)

(52) U.S. Cl.
CPC .......... *B60C 13/001* (2013.01); *B60C 1/0025* (2013.01); *B60C 13/02* (2013.01); *B60C 2013/045* (2013.01)

(58) Field of Classification Search
CPC . B60C 13/00; B60C 2013/045; B60C 13/001; B60C 13/04; B60C 1/0025
See application file for complete search history.

(56) References Cited

U.S. PATENT DOCUMENTS

| 6,474,382 B1 | 11/2002 | Finck | |
| 11,529,829 B2* | 12/2022 | Kubo | B29D 30/48 |
| 2006/0032575 A1* | 2/2006 | Sugiyama | B29D 30/60 |
| | | | 156/87 |

(Continued)

FOREIGN PATENT DOCUMENTS

| CN | 103347711 A | * 10/2013 | ........... B32B 25/042 |
| EP | 2 674 305 A1 | 12/2013 | |

(Continued)

OTHER PUBLICATIONS

Machine Translation JP 2020069941.*

(Continued)

*Primary Examiner* — Justin R Fischer
*Assistant Examiner* — Wendy L Boss
(74) *Attorney, Agent, or Firm* — XSENSUS LLP (57) ABSTRACT

A pneumatic tire can include a tread portion, a pair of sidewall portions, a pair of bead portions, and a carcass. At least one of the sidewall portions can include a first sidewall rubber. The first sidewall rubber can include a base rubber layer, a different color rubber layer, and a barrier rubber layer. The base rubber layer can be in contact with the carcass. At least a part of the different color rubber layer can be exposed in the outer surface of the at least one of the sidewall portions. The barrier rubber layer can be arranged between the different color rubber layer and the base rubber layer. The barrier rubber layer can have a rubber compounding to suppress migration of rubber compounding agents on the base rubber layer side to the different color rubber layer. The barrier rubber layer can have a thickness of 1.0 mm or less.

18 Claims, 3 Drawing Sheets

(56) References Cited

U.S. PATENT DOCUMENTS

| | | | | |
|---|---|---|---|---|
| 2013/0068362 A1* | 3/2013 | Kudo | ................... | B60C 13/001 |
| | | | | 152/450 |
| 2014/0326386 A1* | 11/2014 | Sato | ..................... | B60C 1/0025 |
| | | | | 152/525 |
| 2019/0263196 A1* | 8/2019 | Kawakami | ............ | B60C 13/001 |
| 2021/0197627 A1* | 7/2021 | Nakano | ................. | B60C 13/001 |

FOREIGN PATENT DOCUMENTS

| | | | | | |
|---|---|---|---|---|---|
| EP | 2 803 504 A1 | | 11/2014 | | |
| JP | 2006168616 A | * | 6/2006 | ........... | B32B 25/042 |
| JP | 2012131283 A | * | 7/2012 | | |
| JP | 2013-163521 A | | 8/2013 | | |
| JP | 2016084028 A | * | 5/2016 | | |
| JP | 2016-203420 A | | 12/2016 | | |
| JP | 2020069941 A | * | 5/2020 | | |

OTHER PUBLICATIONS

Machine translation JP 2006168616 (Year: 2006).*
Machine translation CN 103347711 (Year: 2013).*
JP-2012131283 Machine Translation (Year: 2012).*
JP-2016084028-A machine translation (Year: 2016).*
Extended European Search Report issued May 20, 2022 in European Patent Application No. 21210391.5, 8 pages.

* cited by examiner

PNEUMATIC TIRE

CROSS-REFERENCE TO RELATED APPLICATION

This application claims the benefit of foreign priority to Japanese Patent Applications No. JP2020-215293, filed Dec. 24, 2020, wherein the entire content and disclosure of which are incorporated by reference in their entirety.

FIELD

The present disclosure relates to a pneumatic tire.

BACKGROUND

The following Patent Document 1 has proposed a pneumatic tire having a convex pattern on sidewall portions. The above-mentioned pneumatic tire has a non-black rubber layer inside the sidewall portions, and a part of the non-black rubber layer is exposed in a raised surface of the convex pattern.

PRIOR ART

Patent Document

[Patent Document 1]
Japanese Unexamined Patent Application Publication No. 2016-203420
The pneumatic tire disclosed in Patent document 1 is expected to improve the appearance by an exposed different color rubber layer.
However, it is possible that the above-mentioned different color rubber layer is prone to discoloration due to migration of rubber compounding agents such as anti-aging agents from the surrounding rubber members. On the other hand, a barrier rubber layer having a rubber compounding that can inhibit the migration of the rubber compounding agent may be placed between the different color rubber layer and the other rubber members. However, such a barrier rubber layer is often more costly and less durable than other rubber components.

SUMMARY

According to an aspect a pneumatic tire comprising: a tread portion; a pair of sidewall portions; a pair of bead portions; and a carcass extending from one of the bead portions to another one of the bead portions. The at least one of the sidewall portions can include a first sidewall rubber arranged outside the carcass in a tire axial direction, the first sidewall rubber can include a base rubber layer, a different color rubber layer, and a barrier rubber layer, the base rubber layer can be in contact with the carcass, the different color rubber layer can have a color different from a basic color of a first outer surface of the at least one of the sidewall portions, at least a part of the different color rubber layer can be exposed in the first outer surface of the at least one of the sidewall portions, the barrier rubber layer can be arranged between the different color rubber layer and the base rubber layer, the barrier rubber layer can have a rubber compounding to suppress migration of rubber compounding agents on the base rubber layer side to the different color rubber layer, and the barrier rubber layer can have a thickness of 1.0 mm or less.

DETAILED DESCRIPTION

An object of one or more embodiments of the disclosed subject matter, among one or more objects, can be to suppress discoloration of a different color rubber layer in a pneumatic tire with the different color rubber layer exposed in the outer surface of the sidewall portion, while maintaining the manufacturing cost and durability of the tire.

The present disclosure can involve a pneumatic tire including a tread portion, a pair of sidewall portions, a pair of bead portions, and a carcass extending from one of the bead portions to the other one of the bead portions, wherein, at least one of the sidewall portions includes a first sidewall rubber arranged outside the carcass in a tire axial direction, the first sidewall rubber includes a base rubber layer, a different color rubber layer, and a barrier rubber layer, the base rubber layer is in contact with the carcass, the different color rubber layer has a color different from a basic color of an outer surface of the at least one of the sidewall portions, at least a part of the different color rubber layer is exposed in the outer surface of the at least one of the sidewall portions, the barrier rubber layer is arranged between the different color rubber layer and the base rubber layer, the barrier rubber layer has a rubber compounding to suppress migration of rubber compounding agents on the base rubber layer side to the different color rubber layer, and the barrier rubber layer has a thickness of 1.0 mm or less.

Pneumatic tires of one or more embodiments of the present disclosure, such as those adopting the above configuration, can suppress discoloration of the different color rubber layer while maintaining the manufacturing cost and the durability of the tire.

An embodiment of the present disclosure will now be described in detail in conjunction with accompanying drawings.

Figure 1:
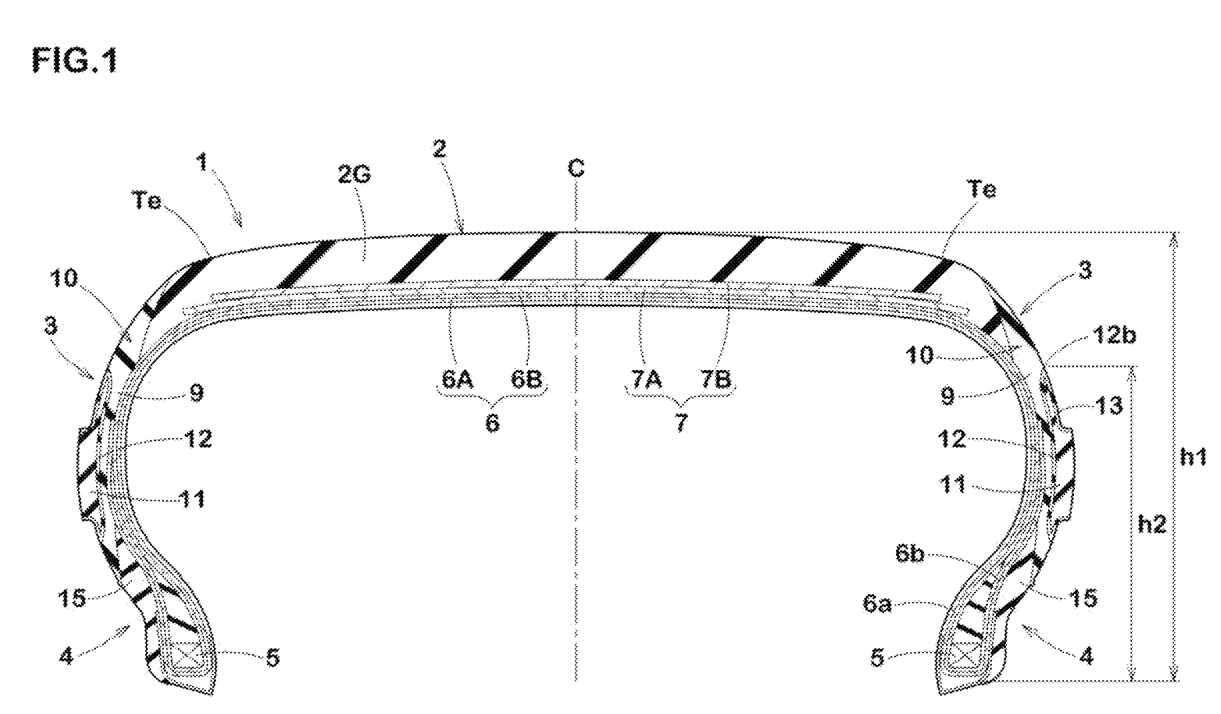
FIG. 1 is a lateral cross-sectional view showing a tire according to an embodiment of the present disclosure.

FIG. 1 shows a lateral cross-sectional view of a pneumatic tire (hereinafter may be referred to simply as "tire") 1 of the present embodiment in a standard state. It should be noted that FIG. 1 shows a so-called tire meridian section passing through a rotational axis of the tire. As shown in FIG. 1, the tire 1 of the present embodiment can be a tire for passenger cars, and can be a relatively low and flat tire having a tire section height (h1) of 120 mm or less, for example. However, the present disclosure is not limited to such an embodiment.

In the case of pneumatic tires for which various standards are specified, the "standard state" can be referred to or characterized as a state in which the tire is mounted on a standard rim, inflated to a standard inner pressure, and loaded with no tire load. In the case of tires for which various standards are not specified, the standard state can refer to a standard operating condition of the tire according to an intended use thereof, which can mean a state in which the tire is not mounted on a vehicle and loaded with no tire load. In the present specification, unless otherwise noted, the dimensions and the like of various parts of the tire are the values measured in the standard state described above.

The "standard rim" can be referred to or characterized as a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" can be referred to or characterized as air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

The tire section height (h1) can be referred to or characterized as a height in a tire radial direction of the tire 1 in the standard state from a bead baseline. Further, the bead baseline can be a tire axial line passing through the rim diameter position defined by the standard on which the tire is based.

The tire 1 of the present embodiment can include a tread portion 2, a pair of sidewall portions 3, a pair of bead portions 4, and a carcass 6 extending from one of the bead portions 4 to the other one of the bead portions 4.

The carcass 6 can be formed by two carcass plies 6A and 6B, for example. Each of the carcass plies 6A and 6B can include a plurality of carcass cords and a topping rubber covering the carcass cords, for example. The carcass cords can be arranged at an angle of 75 degrees or more and 90 degrees or less with respect to a tire circumferential direction, for example. For the carcass cords, organic fiber cords and the like such as nylon, polyester, rayon, and the like, for example, can be suitably employed.

The carcass 6 can have a main body portion (6a) and turned up portions (6b). The main body portion (6a) can extend between bead cores 5 of a pair of the bead portions 4. The turned up portions (6b) can be connected to the main body portion (6a) and can each be turned up around a respective one of the bead cores 5, for instance, to extend outward in the tire radial direction. Each of the turned up portions (6b) of the present embodiment can be turned up around a respective one of the bead cores 5 from inside to outside in a tire axial direction. Further, in each of the turned up portions (6b), an outer end of the carcass ply (6A) can be displaced in the tire radial direction from an outer end of the carcass ply (6B).

In the tread portion 2 of the present embodiment, a belt layer 7 can be arranged radially outside the carcass 6, for example. The belt layer 7 can include two belt plies 7A and 7B, for example. Each of the belt plies 7A and 7B can include belt cords arranged at an angle with respect to the tire circumferential direction and a topping rubber covering the belt cords, for example. It can be preferred that each of the belt cords can be inclined, for instance, at an angle of 10 degrees or more and 45 degrees or less with respect to the tire circumferential direction.

The tread portion 2 can include a tread rubber 2G. Each of the bead portions 4 can include a clinch rubber 15 forming an outer surface of a respective one of the bead portions. At least one (both in the present embodiment) of the sidewall portions 3 can include a first sidewall rubber 10 arranged axially outside the carcass 6.

Figure 2:
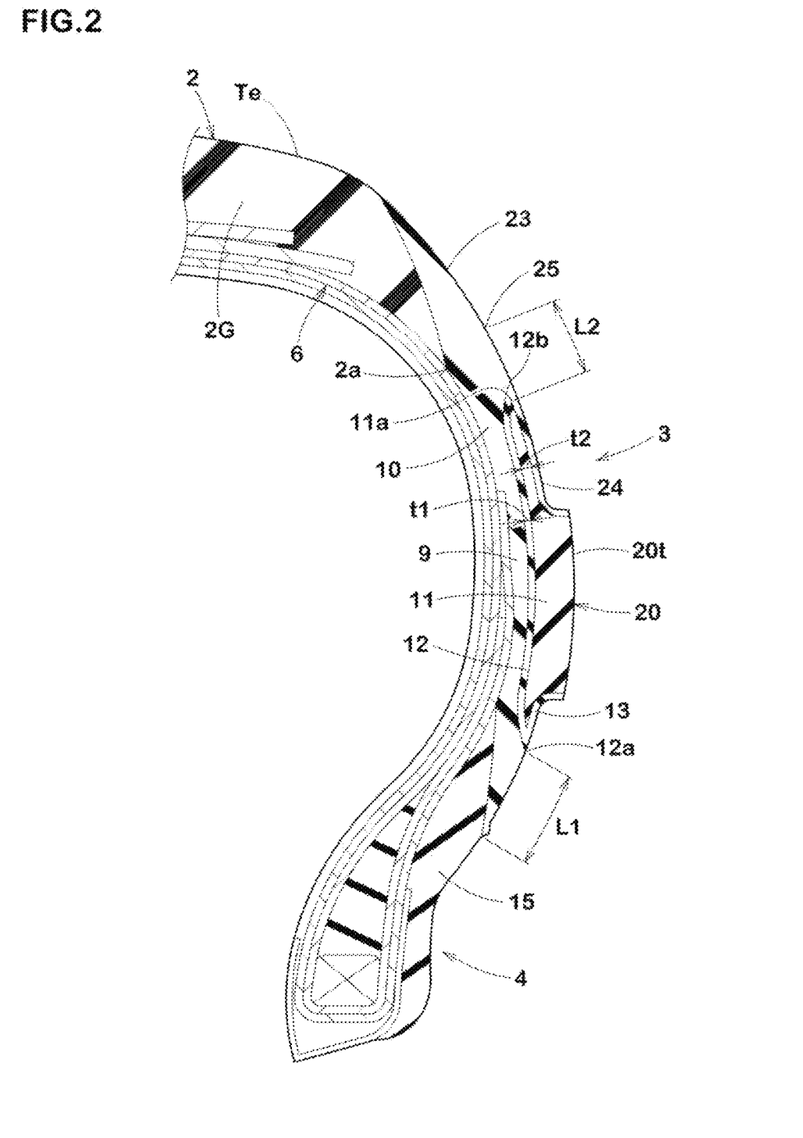
FIG. 2 is an enlarged cross-sectional view of one of the sidewall portions of FIG. 1 FIG. 1.

An enlarged cross-sectional view of one of the sidewall portions 3 is shown in FIG. 2. As shown in FIG. 2, further, the first sidewall rubber 10 can include a base rubber layer 9, a different color rubber layer 11, and a barrier rubber layer 12.

The base rubber layer 9 can be in contact with the carcass 6 and may constitute the main part of the first sidewall rubber 10. It can be preferred that a conventional sidewall rubber member may be used for the base rubber layer 9.

The different color rubber layer 11 can have a color (e.g., white in the present embodiment) different from the basic color (e.g., black in the present embodiment) of the outer surface of the sidewall portions 3, and at least a part of the different color rubber layer 11 can be exposed in the outer surface of a respective one of the sidewall portions 3. In the present embodiment, most of the different color rubber layer 11 can be covered by a cover rubber layer 13 having the basic color mentioned above, and a part of the different color rubber layer 11 can be exposed to form letters, marks, and figures.

Figure 3:
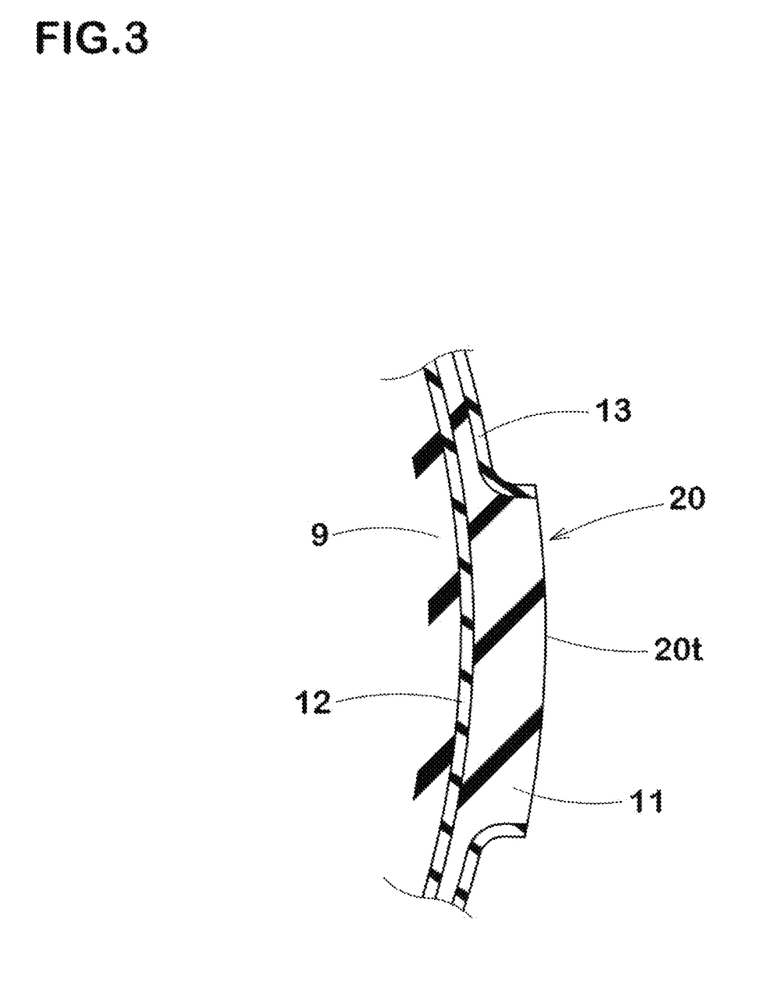
FIG. 3 is an enlarged view of a raised portion of FIG. 2.

FIG. 3 shows an enlarged cross-sectional view of the area where the different color rubber layer 11 is exposed (raised area). In the present embodiment, a raised portion 20 can be provided on the outer surface of each of the sidewall portions 3, and the different color rubber layer 11 can be exposed in a top surface (20t) positioned on an outer side in the tire axial direction. In the manufacturing method of the tire 1 of the present embodiment, for example, a portion of the sidewall portions 3 including the different color rubber layer 11 covered with the cover rubber layer 13 can be placed into the recess of the corresponding vulcanization mold to form the raised portion 20, and then the top surface of the raised portion 20 can be buffed so that the different color rubber layer 11 is exposed. Such a manufacturing method may be known to the public and can be suitably applied to the tire 1 of the present embodiment.

In the present disclosure, it can be sufficient that the different color rubber layer 11 is exposed, and the present disclosure may be applied to tires that are not provided with the raised portion 20 described above.

As shown in FIG. 2, the barrier rubber layer 12 can be arranged between the different color rubber layer 11 and the base rubber layer 9, and can have a rubber compounding, for instance, that can suppress the rubber compounding agents on the base rubber layer 9 side from migrating to the different color rubber layer 11. The barrier rubber layer 12 can have a thickness (t1) of 1.0 mm or less. By adopting the above configuration, in the present disclosure, it can be possible that discoloration of the different color rubber layer 11 can be suppressed while the manufacturing cost and the durability of the tire are maintained. The following mechanisms can be inferred as reasons for the above.

Conventionally, the different color rubber layer 11 may tend to discolor and spoil the appearance of the sidewall portions 3 due to the migration of the rubber compounding agents such as anti-aging agents from the surrounding rubber material and the influence of ultraviolet rays and so on. According to one or more embodiments of the present disclosure, the barrier rubber layer 12 can be arranged between the different color rubber layer 11 and the base rubber layer 9, therefore, the above-mentioned problem can be prevented.

On the other hand, the rubber components that forms the barrier rubber layer 12 tend to be more costly and less durable than conventional sidewall rubber. According to one or more embodiments of the present disclosure, the thickness (t1) of this barrier rubber layer 12 can be limited to be as small as 1.0 mm or less, which can enable the manufacturing cost and the durability of the tire to be maintained.

The more detailed configuration of the present embodiment will be described below. It should be noted that each of the configurations described below can represent a specific form of the present embodiment. Therefore, it goes without saying that the present disclosure can exert the above-mentioned effects even if it does not have the configuration described below. Further, even if any one of the configurations described below is applied alone to the tire of one or more embodiments of the present disclosure having the above-mentioned features, the performance can be expected to be improved according to each configuration. Furthermore, when some of the configurations described below are applied in combination, the combined improvement of performance according to each configuration can be expected.

The base rubber layer 9 can include a portion that is in contact with the clinch rubber 15 of the bead portion 4. Thereby, the barrier rubber layer 12 and the different color rubber layer 11 can be spaced apart from the clinch rubber 15, for instance, over an entirety thereof. Further, the base rubber layer 9 can include a portion that is in contact with the tread rubber 2G forming the tread portion 2. Therefore, the barrier rubber layer 12 and the different color rubber layer 11 can be spaced apart from the tread rubber 2G over an entirety thereof.

In the present embodiment, it can be preferred that an outer end (2*a*) in the tire axial direction of the tread rubber 2G can be covered by the base rubber layer 9 of the first sidewall rubber 10. Thereby, the durability around the boundary between the first sidewall rubber 10 and the tread rubber 2G can be improved.

The barrier rubber layer 12 can be formed entirely of the same rubber compounding. The rubber compounding of the barrier rubber layer 12 can include butyl-based rubber, for example. Butyl-based rubbers can exhibit extremely low air permeability and can effectively inhibit the migration of rubber compounding agents. On the other hand, if the rubber layer containing butyl-based rubber comes into contact with the rim, the rim may be corroded. From such a point of view, it can be preferred that the barrier rubber layer 12 can include 60% or less of butyl-based rubber, and it is more preferred that the barrier rubber layer 12 includes 40% or more and 60% or less of butyl-based rubber.

Further, it can be preferred that the barrier rubber layer 12 can contain inorganic clay minerals such as kaolin clay, clay, mica, feldspar, and a hydrous complex of silica and alumina. Thereby, the aforementioned migration of the rubber compounding agents can be further suppressed. It should be noted that the known rubber compounding can be applied to the barrier rubber layer 12 of one or more embodiments of the present disclosure.

It can be preferred that the barrier rubber layer 12 can have a maximum thickness of 1.0 mm or less. From the point of view of ensuring that the discoloration of the different color rubber layer 11 is suppressed while maintaining the manufacturing cost and the durability of the tire, it can be more preferred that the maximum thickness of the barrier rubber layer 12 can be 0.5 mm or more and 1.0 mm or less.

The barrier rubber layer 12 can have an inner end (12*a*) and an outer end (12*b*) in the tire radial direction each exposed in the outer surface of the tire 1. In a tire meridian section, it can be preferred that a distance L1 can be 10 mm or more and 30 mm or less. The distance L1 can be a distance along the outer surface of the sidewall portion 3 or the bead portion 4 from the inner end (12*a*) in the tire radial direction of the barrier rubber layer 12 to the clinch rubber 15. Thereby, damage near the inner end (12*a*) in the tire radial direction of the barrier rubber layer 12 can be suppressed.

It can be preferred that the distance along the outer surface of the sidewall portion 3 from the outer end (12*b*) in the tire radial direction of the barrier rubber layer 12 to one of tread ground contacting edges (Te) adjacent thereto can be 20 mm or more. Thereby, damage around the outer end (12*b*) of the tire radial direction of the barrier rubber layer 12 can be suppressed. It should be noted that the tread ground contacting edges (Te) can correspond to the axially outermost ground contact positions of the tire 1 when the tire 1 in the standard state is in contact with a flat surface with zero camber angle by being loaded with a standard tire load.

In the case of tires for which various standards are specified, the "standard tire load" can be referred to or characterized as a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. Further, in the case of tires for which various standards are not specified, the "standard tire load" can refer to the load applied to a single tire under a standard mounting condition of the tire. The "standard mounting condition" can refer to the condition in which the tires are mounted on a standard vehicle according to the intended use of the tires and the vehicle is stationary on a flat road surface in a roadworthy condition.

As shown in FIG. 1, it can be preferred that a distance (h2) in the tire radial direction from the bead baseline to the outer end (12*b*) in the tire radial direction of the barrier rubber layer 12 (hereinafter, may be referred to as a "height (h2) of the barrier rubber layer 12") can be 65% or more of the tire section height (h1). In a more preferred embodiment, the height (h2) of the barrier rubber layer 12 can be 65% or more and 75% or less of the tire section height (h1). Thereby, even when the sidewall portions 3 are flexed, it can be possible that the stress is suppressed from concentrating on the outer end (12*b*).

As shown in FIG. 2, the different color rubber layer 11 can be in contact only with the barrier rubber layer 12 and not with any other rubber material, except for the cover rubber layer 13 covering the outer surface of the different color rubber layer 11. Thereby, it can be ensured that the migration of the rubber compounding agents is suppressed.

The outer surface of the tire 1 can include a boundary 25 between a first outer surface 23 vulcanized in a tread mold and a second outer surface 24 vulcanized in a sidewall mold. In general, the above boundary 25 can tend to have a slight burr due to the rubber getting into the gap between the two molds. In other words, near the boundary 25, the movement of the rubber during vulcanization can be large. In the case of the tire 1 having a relatively small tire section height as in the present embodiment, the boundary 25 and the different color rubber layer 11 can be close to each other, therefore, there can be a possibility that the different color rubber layer 11 may be exposed at an unintended location due to the movement of the rubber near the boundary 25. In order to prevent such a problem, the different color rubber layer 11 can be arranged radially inside the boundary 25. Further, in the tire meridian section, it can be preferred that a distance L2 from the boundary 25 to an outer end (11*a*) in the tire radial direction of the different color rubber layer 11 is 10 mm or more and 30 mm or less, for example.

The different color rubber layer 11 can include an exposed portion that is exposed in the outer surface of the sidewall portion 3. As mentioned above, in the present embodiment, the exposed portion of the different color rubber layer 11 can be formed in the top surface (20*t*) of the raised portion 20. It can be preferred that the different color rubber layer 11 has a thickness (t2) of 1.0 mm or more and 2.0 mm or less at a position away from the exposed portion by 10 mm outward in the tire radial direction. Thereby, the rubber volume of the different color rubber layer 11 can be sufficiently ensured around the exposed portion, therefore, the durability of the different color rubber layer 11 can be improved.

The cover rubber layer 13 can be thick enough to prevent the different color rubber layer 11 from being exposed in unnecessary places, for example. On the other hand, if the thickness of the cover rubber layer 13 is excessively large, the workability of the buffing process described above may be decreased. From such a point of view, it can be preferred that the thickness of the cover rubber layer 13 is 0.5 mm or more and 1.0 mm or less.

In a more preferred embodiment, the cover rubber layer 13 can be formed of the same rubber compounding as the barrier rubber layer 12. Thereby, peeling off of the cover rubber layer 13 can be suppressed.

While detailed description has been made of the pneumatic tire according to an embodiment of the present disclosure, the present disclosure can be embodied in various forms without being limited to the illustrated embodiment.

to 5, wherein the higher the score, the better the discoloration resistance performance is.

<Cost of First Sidewall Rubber>

The cost for the production of the first sidewall rubber was calculated. The results are shown on a five-point scale from 1 to 5, wherein the higher the score, the lower the cost of the first sidewall rubber is, which is better.

<Durability of Exposed portion of Different Color Rubber Layer>

After each of the test tires was run on a drum testing machine for 15,000 km at a speed of 80 km/h under a constant longitudinal load, the degree of damage to the exposed portion of the different color rubber layer was visually evaluated. The results are indicated by an evaluation point based on the degree of damage of the Reference 1 being 100, wherein the larger the numerical value, the better the durability of the exposed portion of the different color rubber layer.

The test results are shown in Table 1.

TABLE 1

|  | Ref. 1 | Ref. 2 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Presence (P) or Absence (A) of Barrier rubber layer | A | P | P | P | P | P | P | P | P | P | P | P |
| Thickness (t1) of Barrier rubber layer [mm] | — | 3.0 | 1.0 | 0.5 | 0.8 | 1.0 | 1.0 | 1.0 | 1.0 | 1.0 | 1.0 | 1.0 |
| Thickness (t2) of Different color rubber layer [mm] | 3.0 | 3.0 | 1.5 | 1.5 | 1.5 | 1.0 | 2.0 | 3.0 | 1.5 | 1.5 | 1.5 | 1.5 |
| Ratio of Height (h2) of Barrier rubber layer/ Tire section height (h1) [%] | — | 70 | 70 | 70 | 70 | 70 | 70 | 70 | 60 | 65 | 75 | 80 |
| Discoloration resistance performance of Different color rubber layer [evaluation point] | 1 | 5 | 5 | 5 | 5 | 5 | 5 | 5 | 5 | 5 | 5 | 5 |
| Cost of First sidewall rubber [evaluation point] | 5 | 2 | 5 | 5 | 5 | 5 | 4 | 3 | 5 | 5 | 5 | 5 |
| Durability of Exposed portion of Different color rubber layer [evaluation point] | 100 | 80 | 120 | 110 | 115 | 120 | 120 | 120 | 110 | 115 | 115 | 110 |

EXAMPLES

Pneumatic tires of size 225/50R18 having the basic structure shown in FIG. 1 were made by way of test according to the specifications in Table 1. As Reference 1, pneumatic tires each not having the barrier rubber layer arranged between the base rubber layer and the different color rubber layer were made by way of test. As Reference 2, pneumatic tires each having the barrier rubber layer with a thickness of 3.0 mm and arranged between the base rubber layer and the different color rubber layer were made by way of test. The tires in the References 1 and 2 had substantially the same configuration as the tires in Examples, except for the points mentioned above. For each of the test tires, discoloration resistance performance of the different color rubber layer, the cost of the first sidewall rubber, and the durability of the exposed portion of the different color rubber layer were tested. The common specifications and the test methods for each of the test tires were as follows.

Tire rim: 18×7.0J; Tire inner pressure: 220 kPa

<Discoloration Resistance Performance of Different Color Rubber Layer>

The test tires were run on a drum testing machine for 18 hours at a speed of 80 km/h under a constant longitudinal load. Further, during this run, the part of the sidewall portion where the different color rubber layer was exposed was continuously irradiated with UV light by using a black light. After the above run, the degree of discoloration of the exposed part of the different color rubber layer was visually evaluated. The results are shown on a 5-point scale from 1

From the test results, it was confirmed that the tires in the Examples suppressed the discoloration of the different color rubber layer while maintaining the manufacturing cost and the durability of the tire.

[Statement of Disclosure]

The present disclosure, including one or more embodiments thereof, can include the following aspects.

[Present Disclosure 1]

A pneumatic tire including:
a tread portion;
a pair of sidewall portions;
a pair of bead portions; and
a carcass extending from one of the bead portions to the other one of the bead portions,
wherein, at least one of the sidewall portions includes a first sidewall rubber arranged outside the carcass in a tire axial direction,
the first sidewall rubber includes a base rubber layer, a different color rubber layer, and a barrier rubber layer,
the base rubber layer is in contact with the carcass,
the different color rubber layer has a color different from a basic color of an outer surface of the at least one of the sidewall portions,
at least a part of the different color rubber layer is exposed in the outer surface of the at least one of the sidewall portions,
the barrier rubber layer is arranged between the different color rubber layer and the base rubber layer,
the barrier rubber layer has a rubber compounding to suppress migration of rubber compounding agents on the base rubber layer side to the different color rubber layer, and the barrier rubber layer has a thickness of 1.0 mm or less.

[Present Disclosure 2]

The pneumatic tire according to disclosure 1, wherein
each of the bead portions includes a clinch rubber forming an outer surface of a respective one of the bead portions,
the barrier rubber layer has a part exposed in the outer surface of the at least one of the sidewall portions,
a distance along the outer surface of the at least one of the sidewall portions from an inner end in a tire radial direction of the barrier rubber layer to the clinch rubber is 10 mm or more and 30 mm or less.

[Present Disclosure 3]

The pneumatic tire according to disclosure 1 or 2, wherein the first sidewall rubber includes a cover rubber layer covering an outer surface in the tire axial direction of the different color rubber layer except for a part of the outer surface of the different color rubber layer left uncovered and exposed, and the cover rubber layer is formed of a rubber compounding same as the barrier rubber layer.

[Present Disclosure 4]

The pneumatic tire according to any one of disclosures 1 to 3 further including:
a first outer surface vulcanized in a tread mold;
a second outer surface vulcanized in a sidewall mold; and
a boundary between the first outer surface and the second outer surface, wherein
the different color rubber layer is arranged inside the boundary in a tire radial direction, and
in a tire meridian section, a distance from the boundary to an outer end in the tire radial direction of the different color rubber layer is 10 mm or more and 30 mm or less.

[Present Disclosure 5]

The pneumatic tire according to any one of disclosures 1 to 4, wherein
the different color rubber layer includes an exposed portion exposed in the outer surface of the at least one of the sidewall portions, and
the different color rubber layer has a thickness of 1.0 mm or more and 2.0 mm or less at a position away from the exposed portion by 10 mm outward in a tire radial direction.

[Present Disclosure 6]

The pneumatic tire according to any one of disclosures 1 to 5, wherein a distance in a tire radial direction from a bead baseline to an outer end in the tire radial direction of the barrier rubber layer is 65% or more of a tire section height.

[Present Disclosure 7]

The pneumatic tire according to any one of disclosures 1 to 6, wherein a tire section height is 120 mm or less.

[Present Disclosure 8]

The pneumatic tire according to any one of disclosures 1 to 7, wherein the barrier rubber layer includes 60% or less of butyl-based rubber.

DESCRIPTION OF REFERENCE SIGNS 2 tread portion
3 sidewall portion
4 bead portion
6 carcass
9 base rubber layer
10 first sidewall rubber
11 different color rubber layer
12 barrier rubber layer

The invention claimed is:

1. A pneumatic tire comprising:
a tread portion;
a pair of sidewall portions;
a pair of bead portions;
a carcass extending from one of the bead portions to another one of the bead portions;
a first outer surface including an outer surface of the tread portion and outer surfaces of outer parts in a tire radial direction of the sidewall portions and corresponding to an outer surface of a portion of the tire vulcanized in a tread mold;
second outer surfaces extending radially inward from the first outer surface and each forming the outer surface of a respective one of the sidewall portions other than the first outer surface and each corresponding to an outer surface of a portion of the tire vulcanized in a sidewall mold; and
a boundary defined between the first outer surface and one of the second outer surfaces,
wherein, at least one of the sidewall portions includes a first sidewall rubber arranged outside the carcass in a tire axial direction,
the first sidewall rubber includes a base rubber layer, a different color rubber layer, and a barrier rubber layer,
the base rubber layer is in contact with the carcass,
the different color rubber layer has a color different from a basic color of a sidewall outer surface of the at least one of the sidewall portions,
at least a part of the different color rubber layer is exposed in the sidewall outer surface of the at least one of the sidewall portions,
the barrier rubber layer is between the different color rubber layer and the base rubber layer,
the barrier rubber layer has a rubber compounding to suppress migration of rubber compounding agents on the base rubber layer side to the different color rubber layer,
the barrier rubber layer has a thickness of 1.0 mm or less,
the barrier rubber layer has an innermost end and an outmost end in the tire radial direction each exposed in an outer surface of the pneumatic tire without protruding from the outer surface of the at least one of the sidewall portions,
the at least one of the sidewall portions has the boundary,
the boundary includes a burr,
in the at least one of the sidewall portions, the different color rubber layer is entirely arranged radially inside the boundary,
in a tire meridian section, a distance from the boundary to an outmost end in the tire radial direction of the different color rubber layer is 10 mm or more and 30 mm or less,
the different color rubber layer includes an exposed portion exposed in the outer surface of the at least one of the sidewall portions,
the different color rubber layer has a thickness of 1.0 mm or more and 2.0 mm or less at a position away from the exposed portion by 10 mm outward in the tire radial direction,
each of the bead portions includes a clinch rubber forming a bead portion outer surface of a respective one of the bead portions,
the barrier rubber layer has a part exposed in the sidewall outer surface of the at least one of the sidewall portions, and a distance along the sidewall outer surface of the at least one of the sidewall portions from an inner end in the tire radial direction of the barrier rubber layer to the clinch rubber is 10 mm or more and 30 mm or less.

2. The pneumatic tire according to claim 1, wherein
the first sidewall rubber includes a cover rubber layer covering a different color rubber layer outer surface in the tire axial direction of the different color rubber layer except for a part of the different color rubber layer outer surface of the different color rubber layer left uncovered and exposed, and
the cover rubber layer is formed of a rubber compounding same as the barrier rubber layer.

3. The pneumatic tire according to claim 1, wherein a distance in the tire radial direction from a bead baseline to an outer end in the tire radial direction of the barrier rubber layer is 65% or more of a tire section height.

4. The pneumatic tire according to claim 1, wherein a tire section height is 120 mm or less.

5. The pneumatic tire according to claim 1, wherein the barrier rubber layer includes 60% or less of butyl-based rubber.

6. The pneumatic tire according to claim 1, wherein
the outer surface of the at least one of the sidewall portions is provided with a raised portion,
the raised portion has a top surface located on an outer side in the tire axial direction, and
the different color rubber layer is exposed in the top surface of the raised portion.

7. The pneumatic tire according to claim 1, wherein
the base rubber layer includes a portion in contact with the clinch rubber, and
the barrier rubber layer and the different color rubber layer are spaced apart from the clinch rubber over an entirety thereof.

8. The pneumatic tire according to claim 7 further comprising a tread rubber forming the tread portion, wherein
the base rubber layer includes a portion in contact with the tread rubber, and
the barrier rubber layer and the different color rubber layer are spaced apart from the tread rubber over an entirety thereof.

9. The pneumatic tire according to claim 8, wherein an outer end in the tire axial direction of the tread rubber is covered by the base rubber layer.

10. The pneumatic tire according to claim 5, wherein the barrier rubber layer includes 40% or more of the butyl-based rubber.

11. The pneumatic tire according to claim 5, wherein the barrier rubber layer contains an inorganic clay mineral including at least one of kaolin clay, clay, mica, feldspar, and a hydrous complex of silica and alumina.

12. The pneumatic tire according to claim 1, wherein a maximum thickness of the barrier rubber layer is 0.5 mm or more and 1.0 mm or less.

13. The pneumatic tire according to claim 1, wherein a distance along the sidewall outer surface of the at least one of the sidewall portions from one of tread edges on the at least one of the sidewall portions side to an outer end in the tire radial direction of the barrier rubber layer is 20 mm or more.

14. The pneumatic tire according to claim 3, wherein the distance from the bead baseline to the outer end of the barrier rubber layer is 75% or less of the tire section height.

15. The pneumatic tire according to claim 2, wherein the different color rubber layer is in contact only with the barrier rubber layer and not with any other rubber material, except for the cover rubber layer.

16. The pneumatic tire according to claim 2, wherein the cover rubber layer has a thickness of 0.5 mm or more and 1.0 mm or less.

17. The pneumatic tire according to claim 2, wherein
the outer surface of the at least one of the sidewall portions has a raised portion,
the raised portion has a top surface on an outer side in the tire axial direction,
the different color rubber layer is exposed in the top surface of the raised portion, and
the cover rubber layer is exposed on opposite sides of the raised portion in the tire radial direction at opposite portions where the cover rubber layer does not protrude from the sidewall outer surface of the at least one of the sidewall portions.

18. A pneumatic tire comprising:
a tread portion;
a pair of sidewall portions;
a pair of bead portions;
a carcass extending from one of the bead portions to another one of the bead portions;
a first outer surface including an outer surface of the tread portion and outer surfaces of outer parts in a tire radial direction of the sidewall portions and corresponding to an outer surface of a portion of the tire vulcanized in a tread mold;
second outer surfaces extending radially inward from the first outer surface and each forming the outer surface of a respective one of the sidewall portions other than the first outer surface and each corresponding to an outer surface of a portion of the tire vulcanized in a sidewall mold; and
a boundary defined between the first outer surface and one of the second outer surfaces,
wherein, at least one of the sidewall portions includes a first sidewall rubber arranged outside the carcass in a tire axial direction,
the first sidewall rubber includes a base rubber layer, a different color rubber layer, and a barrier rubber layer,
the base rubber layer is in contact with the carcass,
the different color rubber layer has a color different from a basic color of a sidewall outer surface of the at least one of the sidewall portions,
at least a part of the different color rubber layer is exposed in the sidewall outer surface of the at least one of the sidewall portions,
the barrier rubber layer is between the different color rubber layer and the base rubber layer,
the barrier rubber layer has a rubber compounding to suppress migration of rubber compounding agents on the base rubber layer side to the different color rubber layer,
the barrier rubber layer has a thickness of 1.0 mm or less,
the barrier rubber layer has an innermost end and an outmost end in the tire radial direction each exposed in an outer surface of the pneumatic tire without protruding from the outer surface of the at least one of the sidewall portions,
the at least one of the sidewall portions has the boundary,
the boundary includes a burr,
in the at least one of the sidewall portions, the different color rubber layer is entirely arranged radially inside the boundary, in a tire meridian section, a distance from the boundary to an outmost end in the tire radial direction of the different color rubber layer is 10 mm or more and 30 mm or less, the different color rubber layer includes an exposed portion exposed in the outer surface of the at least one of the sidewall portions, the different color rubber layer has a thickness of 1.0 mm or more and 2.0 mm or less at a position away from the exposed portion by 10 mm outward in the tire radial direction, the first sidewall rubber includes a cover rubber layer covering a different color rubber layer outer surface in the tire axial direction of the different color rubber layer except for a part of the different color rubber layer outer surface of the different color rubber layer left uncovered and exposed, and the cover rubber layer is formed of a rubber compounding same as the barrier rubber layer.

\* \* \* \* \*